H. S. & A. PHELPS.
Hand Potato-Diggers.
No. 149,676.   Patented April 14, 1874.
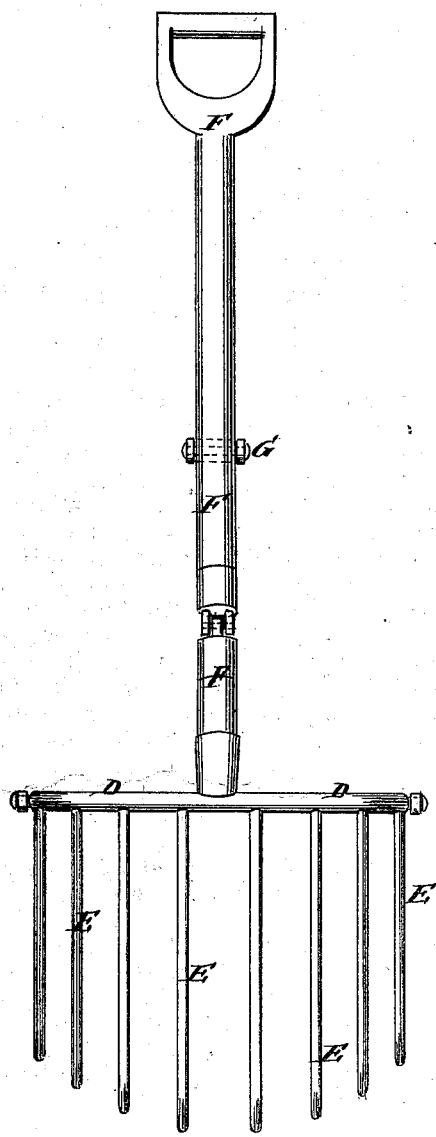
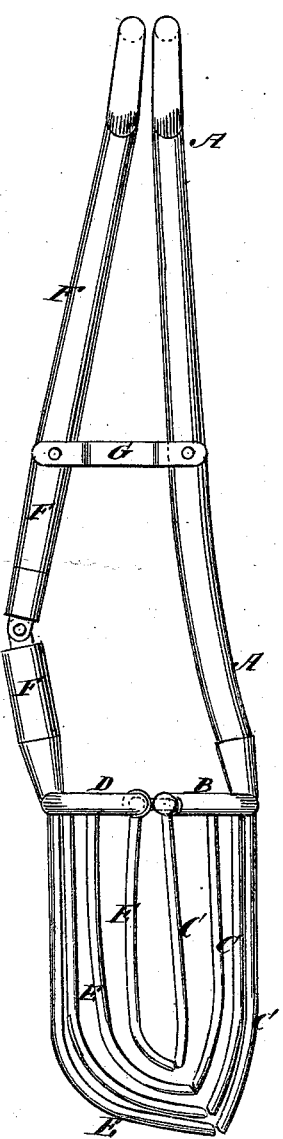

UNITED STATES PATENT OFFICE.

HORACE S. PHELPS AND ALFRED PHELPS, OF FRANKLIN, NEW YORK.

IMPROVEMENT IN HAND POTATO-DIGGERS.

Specification forming part of Letters Patent No. 149,676, dated April 14, 1874; application filed January 31, 1874.

*To all whom it may concern:*

Be it known that we, HORACE S. PHELPS and ALFRED PHELPS, of Franklin, in the county of Delaware and State of New York, have invented a new and useful Improvement in Hand Potato Digger and Picker, of which the following is a specification:

Figure 1 is a front view of our improved machine. Fig. 2 is a side view of the same.

Similar letters of reference indicate corresponding parts.

Our invention has for its object to furnish a hand machine for digging potatoes, separating them from the dirt, and putting them into a basket, and which shall be simple in construction and convenient in use. The invention consists in the combination of the curved bar, the prongs, the jointed handle, and the pivoted bar with the fork, as hereinafter fully described.

A represents a handle similar to an ordinary fork or shovel handle, to the lower end of which is attached a curved bar, B, provided with downwardly-projecting prongs C. To the ends of the curved bar B are pivoted the ends of a similar curved bar, D, provided with prongs E, the lower parts of which are curved inward to meet the ends of the prongs C. To the curved bar D is attached a handle, F, which is jointed a little above the bar D. G is a connecting-bar, one end of which is pivoted to the jointed handle F a little above the joint, and its other end is pivoted to the handle A.

In using the machine, the upper end of the jointed handle F is pushed outward, which raises the prongs E away from the prongs C, and allows the said prongs C to be thrust into the ground in the manner of an ordinary fork. The end of the handle F is then drawn toward the handle A, which forces the prongs E into the ground to meet the prongs C, inclosing the potatoes between the prongs C E. The operator then lifts the digger upward, draws it toward him, shakes out the dirt, and drops the potatoes into a basket by pushing the end of the handle F outward, leaving the parts in position for the prongs C to be again thrust into the ground.

Having thus described our invention, we claim as new and desire to secure by Letters Patent—

The combination of the curved bar D, the prongs E, the jointed handle F, and the pivoted bar G with the fork A B C, substantially as herein shown and described.

HORACE S. PHELPS.
     ALFRED PHELPS.

Witnesses:
 CHARLES BALDWIN,
 HENRY A. KINGSLEY.